United States Patent Office 3,001,908

Patented Sept. 26, 1961

1

3,001,908

GLYOXIME SEED DISINFECTANT

Jean Bradley Harrison, Wilmington, Del., assignor to E. I. du Pont de Nemours and Company, Wilmington, Del., a corporation of Delaware No Drawing. Filed Apr. 12, 1960, Ser. No. 21,583

3 Claims. (Cl. 167—22)

This invention relates to the use of glyoxime as a protectant for seeds.

It has been found that glyoxime is particularly useful in the treatment of such seeds as corn, cotton, sorghum, soybeans, and the like.

The glyoxime can be applied to the seeds by conventional procedures, such as by spraying or admixture in conventional slurry treaters. Alternatively, the glyoxime can be pelleted with the seed being treated.

An outstanding advantage of glyoxime in the present invention is its ability to be formulated in true solution in a liquid composition. To the best of my knowledge at the present time, there is no satisfactory seed protectant compound known that is satisfactorily soluble in commercially cheap solvents.

In the practice of the present invention, the glyoxime is applied to the seeds at a rate generally within the range from 0.05 to about 5 ounces of glyoxime per 100 pounds of seed. For use in pelleted seed applications, somewhat higher rates are generally used, such as on the order from 0.05 ounce to as high as 4 pounds and even higher per 100 pounds of seed. The exact rate can readily be determined within these ranges in accordance with well known procedures.

The glyoxime will normally be applied to the seeds in either solid or liquid formulations, as will be readily understood. Suitable formulations are disclosed, for example, in Flenner U.S. Patent No. 2,883,407, issued April 21, 1959, and the composition disclosure of this Flenner patent is herewith incorporated by reference.

A particularly outstanding formulation comprises 1–99% glyoxime, 20–95% methyl Cellosolve as a solvent, and up to 5% of a dye. The composition can in addition optionally contain water, a sticker material such as a sticker solvent, as well as other solvents such as dimethylformamide and N-methylpyrrolidone.

In a preferred solid composition, the formulation comprises 1–99% glyoxime, up to 5% of a solid wetting agent, and up to 5% of a dye. Preferred solid wetting agents are "Aerosol" OT-B, primarily dioctyl sodium sulfosuccinate; "Renex" 35, polyoxyethylene tridecyl alcohol plus urea; "Alkanol" B sodium alkyl naphthalene sulfonate; and fatty alcohol sulfates.

The glyoxime can be used with significant advantages in combination with known fungicides and seed protecting agents. Particularly advantageous are tetramethyl thiuram disulfide, other tetraalkyl thiuram disulfides, dithiocarbamates such as manganese or zinc ethylenebisdithiocarbamate, and ferric, zinc, manganese and other heavy metal salts of dimethyldithiocarbamic acid, ethylmethyldithiocarbamic acid, n-butyldithiocarbamic acid and of other dithiocarbamic acids derived from primary and secondary amines. Other suitable materials include derivatives of rhodamine, such as 3-(p-chlorophenyl)-5-methylrhodamine, N-trichloromethylmercapto-4-cyclohexane-1,2-dicarboximide, N-trichloromethylmercaptophthalimide, ethyl mercury p-toluenesulfonanilide, N,N'-diphenyl-p-phenylenediamine, 2,3-dichloro-1,4-naphthoquinone, tetrachloro-p-benzoquinone, 2,4-dichloro-6-chloroanilinotriazine and copper quinolinate. Other organo mercury compounds can of course be used.

2

*Example 1*

The following compositions are prepared by mixing the indicated ingredients in the indicated proportions by weight:

A

| | Percent |
|---|---|
| Glyoxime | 8 |
| Dimethylformamide | 46 |
| Water | 46 |

B

| | |
|---|---|
| Glyoxime | 30.0 |
| Dimethylformamide | 69.7 |
| Rhodamine B dye | 0.3 |

C

| | |
|---|---|
| Glyoxime | 20 |
| Methocel | 77 |
| Spirit-soluble red dye | 3 |

The following composition is prepared by blending, grinding in a hammer mill, and reblending:

D

| | Percent |
|---|---|
| Glyoxime | 50.00 |
| Aerosol OT-B (85% dioctyl sodium sulfocucinate) | 0.50 |
| Methocel—low viscosity methyl Cellosolve | 0.50 |
| Rhodamine B extra dye | 0.35 |
| Orange G dye | 1.65 |
| Sodium sulfate | 47.00 |

Highly effective seed protection is obtained by applying in a conventional slurry treater composition A to hybrid field corn seed at a rate to provide three-quarters of an ounce of glyoxime per 100 pounds of seed; composition B diluted with 3 parts of water to cucumber seed to provide 1.2 ounce of glyoxime per 100 pounds of seed; composition C diluted with 2 parts of water to sorghum seed to provide 0.9 ounce of glyoxime per 100 pounds of seed; and composition D diluted with 5 parts of water to acid-delinted cotton seed to provide 1.2 ounce of glyoxime per 100 pounds of seed.

The invention claimed is:

1. The method of treating seeds comprising applying glyoxime to said seeds.

2. A composition particularly useful for treating seeds comprising glyoxime, methyl Cellosolve and a dye.

3. A composition particularly useful for treating seeds comprising glyoxime, methyl Cellosolve and Rhodamine B dye.

References Cited in the file of this patent

UNITED STATES PATENTS 2,339,335 Heckmanns ............ Jan. 18, 1944

OTHER REFERENCES

Frear: A Catalogue of Insecticides and Fungicides, vol. I, p. 35, 1948.

Hackh's Chemical Dictionary, 3rd Ed., 1944, p. 178.